(12) United States Patent
Denney et al.

(10) Patent No.: US 9,272,358 B2
(45) Date of Patent: Mar. 1, 2016

(54) HOT-WIRE CONSUMABLE TO PROVIDE SELF-LUBRICATING WELD OR CLAD

(71) Applicant: LINCOLN GLOBAL, INC., City of Industry, CA (US)

(72) Inventors: Paul Edward Denney, Bay Village, OH (US); Michael Whitehead, Strongsville, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 286 days.

(21) Appl. No.: 13/790,202

(22) Filed: Mar. 8, 2013

(65) Prior Publication Data

US 2014/0021186 A1 Jan. 23, 2014

Related U.S. Application Data

(60) Provisional application No. 61/673,562, filed on Jul. 19, 2012.

(51) Int. Cl.
| | |
|---|---|
| B23K 9/24 | (2006.01) |
| B23K 35/36 | (2006.01) |
| B23K 35/365 | (2006.01) |
| B23K 35/368 | (2006.01) |
| B23K 35/22 | (2006.01) |
| B23K 35/24 | (2006.01) |

(52) U.S. Cl.
CPC . *B23K 9/24* (2013.01); *B23K 35/22* (2013.01); *B23K 35/24* (2013.01); *B23K 35/36* (2013.01); *B23K 35/365* (2013.01); *B23K 35/368* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,770,871 | A * | 11/1956 | Demalander | 428/682 |
| 3,332,752 | A | 7/1967 | Batchelor et al. | |
| 3,807,966 | A * | 4/1974 | Butcher et al. | 428/565 |
| 4,683,368 | A * | 7/1987 | Das | 219/146.1 |
| 5,302,450 | A | 4/1994 | Rao et al. | |
| 5,514,422 | A * | 5/1996 | McCune | 427/449 |
| 6,428,596 | B1 * | 8/2002 | Urevich et al. | 75/252 |
| 6,750,430 | B2 * | 6/2004 | Kelly | 219/146.41 |
| 6,855,913 | B2 * | 2/2005 | Nikodym | 219/137 WM |

(Continued)

FOREIGN PATENT DOCUMENTS

| | | |
|---|---|---|
| DE | 10334704 A1 | 2/2005 |
| GB | 2273109 A | 6/1994 |

(Continued)

OTHER PUBLICATIONS

International Application No. PCT/IB2013/001573, International Search Report & Written Opinion, 11 pages, Feb. 5, 2014.

*Primary Examiner* — Dana Ross
*Assistant Examiner* — Renee L Miller
(74) *Attorney, Agent, or Firm* — Perkins Coie LLP

(57) ABSTRACT

A filler wire (consumable) for depositing self-lubricating materials in a system for any of brazing, cladding, building up, filling, hard-facing overlaying, welding, and joining applications. The filler wire is composed of a base filler material consistent with commonly known compositions. For example, the base filler material can comprise standard materials used in many standard mild steel wires. In addition to the base filler materials, the consumable includes self-lubricating materials. The self-lubricating materials include at least one of graphite particles and graphite powder, and can include other self-lubricating materials.

16 Claims, 5 Drawing Sheets

(56) References Cited

U.S. PATENT DOCUMENTS

| | | | |
|---|---|---|---|
| 2003/0116234 A1* | 6/2003 | Santella et al. | 148/437 |
| 2004/0142196 A1 | 7/2004 | Hajmrle et al. | |
| 2006/0207984 A1* | 9/2006 | Karogal | 219/145.22 |
| 2006/0261054 A1* | 11/2006 | Katiyar | 219/145.22 |
| 2008/0093350 A1* | 4/2008 | Ma et al. | 219/145.1 |
| 2008/0264924 A1* | 10/2008 | Duncan et al. | 219/145.1 |
| 2011/0297658 A1 | 12/2011 | Peters et al. | |

FOREIGN PATENT DOCUMENTS

| | | |
|---|---|---|
| JP | 59-85396 A | 5/1987 |
| JP | 5-171463 A | 7/1993 |

* cited by examiner

HOT-WIRE CONSUMABLE TO PROVIDE SELF-LUBRICATING WELD OR CLAD

PRIORITY

The present application claims priority to U.S. Provisional Patent Application No. 61/673,562, which is incorporated herein by reference in its entirety.

TECHNICAL FIELD

Certain embodiments relate to a filler wire (consumable) used in any of brazing, cladding, building up, filling, hard-facing overlaying, welding, and joining applications. More particularly, certain embodiments relate to a system and method that uses a filler wire to deposit self-lubricating material in a system for any of brazing, cladding, building up, filling, hard-facing overlaying, joining, and welding applications.

BACKGROUND

In traditional arc welding or surfacing (cladding, etc.) operations a filler wire may be used to deposit material into the joint using a high temperature arc. Heat from the arc melts the filler wire and the melted filler wire droplets are added to the weld puddle. However, because of the presence of the arc the composition of the filler wire can be limited as certain materials and compositions do not transfer easily, or at all, with the use of an arc. This can be due to a number of reasons, including the high temperature of the arc or due to the arc/plasma dynamics present in the arc. However, it is very desirable to have some of these components deposited into a surfacing operation or weld joint and as such there is a need to be able to use filler wires with various compositions and components therein.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method to use at least one filler wire (consumable) to deposit self-lubricating material in a system for any of brazing, cladding, budding up, filling, hard-facing overlaying, welding, and joining applications. The filler wire is composed of a base filler material consistent with commonly known consumable compositions used in various brazing, cladding, building up, filling, hard-facing overlaying, welding, and joining applications. For example, the base filler material can comprise standard materials such as iron, carbon, silicon, nickel, chromium, copper, sulfur, etc., used in many standard mild steel solid wires such as, for example, ER70S-6. In addition to the base filler materials, the consumable of the present invention includes self-lubricating materials. The self-lubricating materials include at least one of graphite particles and graphite powder, or other materials that can decrease the surface friction of a weld joint or cladding layer as it wears, including but not limited to copper, tin or molybdenum disulfide.

The system includes a high intensity energy source which heats at least one workpiece at least while using a laser or a hot-wire power supply to heat at least one filler wire (consumable) that is consistent with the present invention. The method includes applying energy from a high intensity energy source to at least one workpiece to heat the at least one workpiece at least while using a laser or a hot-wire power supply to heat at least one filler wire (consumable) that is consistent with the present invention. The high intensity energy source may include at least one of a laser device, a plasma arc welding (PAW) device, a gas tungsten arc welding (GTAW) device, a gas metal arc welding (GMAW) device, a flux cored arc welding (FCAW) device, and a submerged arc welding (SAW) device.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
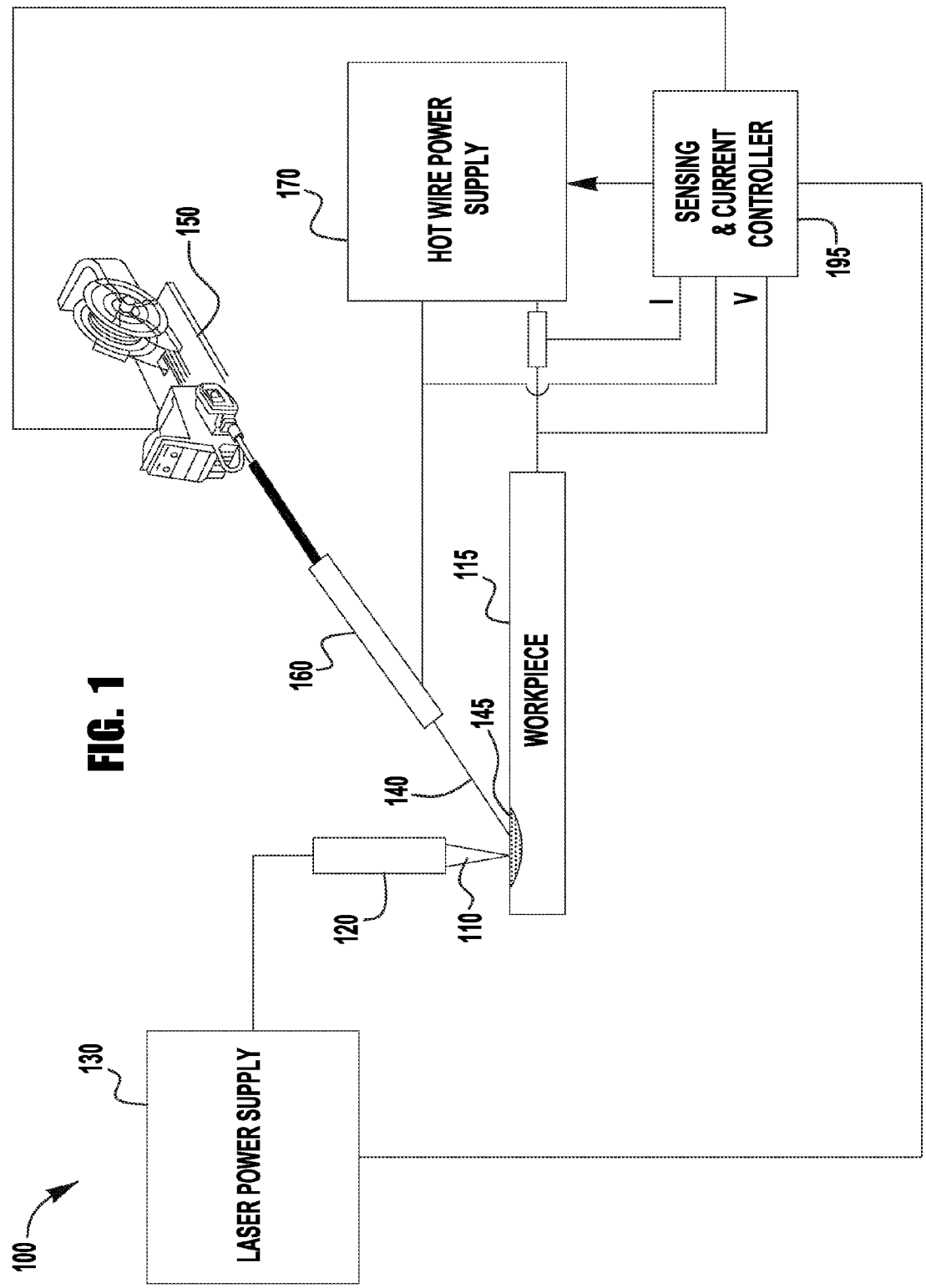
FIG. 1 illustrates a functional schematic block diagram of an exemplary embodiment of a combination filler wire feeder and energy source system for any of brazing, cladding, building up, filling, hard-facing overlaying, welding, and joining applications.

Exemplary embodiments of the invention will now be described below by reference to the attached Figures. The described exemplary embodiments are intended to assist in the understanding of the invention, and are not intended to limit the scope of the invention in any way. Although much of the following discussions will reference "welding" operations and systems, embodiments of the present invention are not just limited to joining operations, but can similarly be used for cladding, brazing, overlaying, etc.—type operations. Like reference numerals refer to like elements throughout.

For purposes of the present invention and application it is noted that the term "self-lubricating" refers to a material or materials that reduces the surface friction of a weld joint or cladding layer as the weld or cladding layer wears.

Welding/joining operations typically join multiple workpieces together in a welding operation where a filler metal is combined with at least some of the workpiece metal to form a joint. In such operations, the filler material may not be of the exact composition as the workpieces. Accordingly, it is not uncommon for the joint to have properties that are different as compared to the rest of the workpiece. For example, the surface friction of the joint may be very high, whereas the surface friction of the workpiece is very low. In such cases, it would be desirable to have the joint composed of self-lubricating materials (for example, graphite) that produce a surface friction that is inline with the workpiece. Further, it may be beneficial to use the weld joint and/or the surfacing or cladding to provide a reduced friction surface, regardless of the surface friction of the workpiece. However because the traditional methods use an arc to transfer the filler material, the ability to add such self-lubricating materials to the filler material may be limited as the self-lubricating materials may get consumed in the arc, rather than being deposited in the weld puddle. As described below, exemplary embodiments of the present invention can deposit self-lubricating materials into the weld and provide significant advantages over existing welding technologies.

It should be noted that although the majority of the following discussion, discusses using graphite or graphite powder as the lubricant, this is intended to be exemplary and other low friction materials can be used in embodiments of the present invention, and substituted in the following discussions. Such materials can include copper, tin, and molybdenum disulfide, as well as other known friction reducing materials.

FIG. 1 illustrates a functional schematic block diagram of an exemplary embodiment of a combination filler wire feeder and energy source system 100 for performing any of brazing, cladding, building up, filling, hard-facing overlaying, and joining/welding applications. The system 100 includes a high energy heat source capable of heating the workpiece 115 to form a weld puddle 145. The high energy heat source can be a laser subsystem 130/120 that includes a laser device 120 and a laser power supply 130 operatively connected to each other. The laser 120 is capable of focusing a laser beam 110 onto the workpiece 115 and the power supply 130 provides the power to operate the laser device 120. The laser subsystem 130/120 can be any type of high energy laser source, including but not limited to carbon dioxide, Nd:YAG, Yb-disk, YB-fiber, fiber delivered, or direct diode laser systems. Further, even white light or quartz laser type systems can be used if they have sufficient energy. For example, a high intensity energy source can provide at least 500 W/cm$^2$.

The following specification will repeatedly refer to the laser subsystem 130/120, beam 110 and laser power supply 130, however, it should be understood that this reference is exemplary as any high intensity energy source may be used. For example, other embodiments of the high energy heat source may include at least one of an electron beam, a plasma arc welding subsystem, a gas tungsten arc welding subsystem, a gas metal arc welding subsystem, a flux cored arc welding subsystem, and a submerged arc welding subsystem. It should be noted that the high intensity energy sources, such as the laser device 120 discussed herein, should be of a type having sufficient power to provide the necessary energy density for the desired welding operation. That is, the laser device 120 should have a capability to modify the energy from the laser power supply (or other source) to create and maintain a stable weld puddle throughout the welding process, and also reach the desired weld penetration. For example, for some applications, lasers should have the ability to "keyhole" into the workpieces being welded. This means that the laser should have sufficient power to penetrate (fully or partially) into the workpiece, while maintaining that level of penetration as the laser travels along the workpiece. Exemplary lasers should have power capabilities in the range of 1 to 20 kW, and may have a power capability in the range of 5 to 20 kW. In other exemplary embodiments, the power density can be in the range of $10^5$ to $10^8$ watts/cm$^2$. Higher power lasers can be utilized, but can become very costly.

The system 100 also includes a hot filler wire feeder subsystem capable of providing at least one resistive filler wire 140 to make contact with the workpiece 115 in the vicinity of the laser beam 110. Of course, it is understood that by reference to the workpiece 115 herein, the molten puddle, i.e., weld puddle 145, is considered part of the workpiece 115, thus reference to contact with the workpiece 115 includes contact with the puddle 145. The hot filler wire feeder subsystem includes a filler wire feeder 150, a contact tube 160, and a hot wire power supply 170. In accordance with an embodiment of the present invention, the hot wire welding power supply 170 is a direct current (DC) power supply (that can be pulsed, for example), although alternating current (AC) or other types of power supplies are possible as well. The wire 140 is fed from the filler wire feeder 150 through the contact tube 160 toward the workpiece 115 and extends beyond the tube 160. During operation, the extension portion of the filler wire 140 is resistance-heated by an electrical current from the hot wire welding power supply 170, which is operatively connected between the contact tube 160 and the workpiece 115. Prior to its entry into the weld puddle 145 on the workpiece 115, the extension portion of the wire 140 may be resistance-heated such that the extension portion approaches or reaches the melting point before contacting the weld puddle 145 on the workpiece 115. Because the filler wire 140 is heated to at or near its melting point, its presence in the weld puddle 145 will not appreciably cool or solidify the puddle 145 and the wire 140 is quickly consumed into the weld puddle 145. The laser beam 110 (or other energy source) serves to melt some of the base metal of the workpiece 115 to form the weld puddle 145 and complete the melting of the wire 140 onto the workpiece 115. However, the power supply 170 provides the energy needed to resistance-heat the filler wire 140 to or near a molten temperature.

The system 100 also includes sensing and control unit 195. The sensing and control unit 195 can be operatively connected to the power supply 170, the wire feeder 150, and/or the laser power supply 130 to control the welding process in system 100. U.S. patent application Ser. No. 13/212,025, titled "Method And System To Start And Use Combination Filler Wire Feed And High Intensity Energy Source For Welding" is incorporated by reference in its entirety, provides exemplary startup and post-startup control algorithms that may be incorporated in sensing and control unit 195 for operating system 100.

Unlike most welding processes, the present invention melts the filler wire 140 into the weld puddle 145 rather than using a welding arc to heat, melt and transfer the filler wire 140 into the weld puddle 145. Because no arc is used to transfer of the filler wire 140 in the process described herein, the filler wire can include materials that normally would be consumed in, or interact with the arc in such a manner as to not exist in the puddle following solidification. For example, the filler wire 140 may include self-lubricating materials, such as graphite, in order to reduce the surface friction of the weld. These structures, due to heating or chemical activity in the arc, may change their structure, composition, and/or properties. It should be noted that the term "self-lubricating" is intended to mean materials or compositions that generally have a low friction level and are typically used to reduce the level of friction between mechanical components, including but not limited to graphite. Accordingly, the following description also uses the term "low friction" to describe the particles described herein. In either case these terms are intended to describe a material having a friction level less than that of either the workpiece and/or the solidified puddle 145.

Figure 2A:
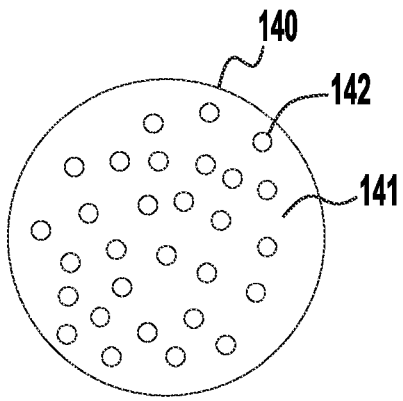
FIGS. 2A-B illustrate exemplary embodiments of filler wires that can be used in the system of FIG. 1.
Figure 2B:
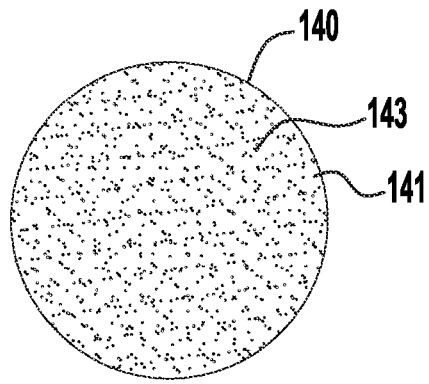

In some exemplary embodiments of the present invention, the self-lubricating material is composed of small graphite particles. As shown in FIG. 2A, the filler wire 140 is composed of the base filler material 141, which can be any standard filler material that is appropriate for the weld process. For example, the base filler material 141 can comprise standard materials such as iron, carbon, silicon, nickel, chromium, copper, sulfur, etc., used in many standard mild steel solid wires such as, for example, ER70S-6. In addition to the base filler materials, the consumable of the present invention includes self-lubricating materials. For example, embedded in the base filler material 141 are graphite particles 142 that can have a nominal diameter of, for example, in the range of 5 microns to 200 microns, in other embodiments the particles are larger and can have a nominal diameter in the range of 200 to 400 microns. Of course, other particle sizes can be used without departing from the scope of the present invention, so long as the particles can be deposited and provide the desired performance. In some embodiments, the graphite particles are large enough such that they do not react/mix with the puddle matrix too quickly. For example, in some instances the graphite will react with oxides (such as iron oxide) and give off CO, which can be disadvantageous. The density of the graphite particles 142 in filler material 141 will depend on environment that the workpiece will see. For example, the density of graphite particles 142 in filler material 141 will be higher for a workpiece that is exposed to an environment where other objects or materials are sliding on its surface than for a workpiece that is in a less abrasive environment. In exemplary embodiments of the present invention, the volume percent of graphite particles in the wire 140 will be in the range of 5%-30%, while in other embodiments the range can be 5 to 50%. However, embodiments have a different density depending on the environment for the completed workpiece. In other exemplary embodiments, such as that shown in FIG. 2B, graphite powder 143 is mixed with the filler material 141 to produce the filler wire 140. The graphite powder 143 is finer then the graphite particles 142 and the graphite powder 143 can have a nominal diameter in the range of 5 to 200 microns, and in other embodiments have a nominal diameter in the range of 20 to 100 microns. In addition, the volume percentage of graphite powder in the wire 140 can be in the range of 5% to 50%. Of course, the filler wire 140 may include a combination of graphite particles 142 and graphite powder 143 and the combined volume percentage being in the range of 5% to 50%. It is noted that the previously stated ranges are the same regardless of the self-lubricating materials used, for example, copper, tin or molybdenum disulfide, or other materials. The filler wire 140, with the embedded graphite particles 142 and/or graphite powder 143, may be manufactured using known methods such as combining the graphite particles or graphite powder with filler metal powder and then sintering them. It should be noted that although the following discussion often refers to "graphite" this is merely intended to be exemplary as other low friction materials can be used, such as those referenced previously. Additionally, a mixture of self-lubricating materials can be used. For example, the consumable may use a combination of different types of self-lubricating materials, including two or more of any of graphite, copper, tin, or molybdenum disulfide, or other low friction materials. The combinations can use any ratio of the different materials, for example the materials can have a 1 to 1 ratio such that 50% of the self lubricating materials is of one type and the other 50% is of a another type. Of course embodiments can use other ratios, and can include any mixture of particle and powder size for each respective material utilized. However, regardless of the mixture of components and materials the combined volume percentage should remain in the range of 5 to 50% as discussed above.

Figure 3A:
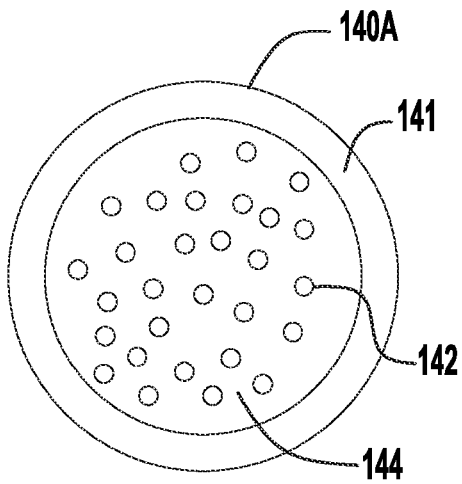
FIGS. 3A-B illustrate exemplary embodiments of filler wires that can be used in the system of FIG. 1.
Figure 3B:
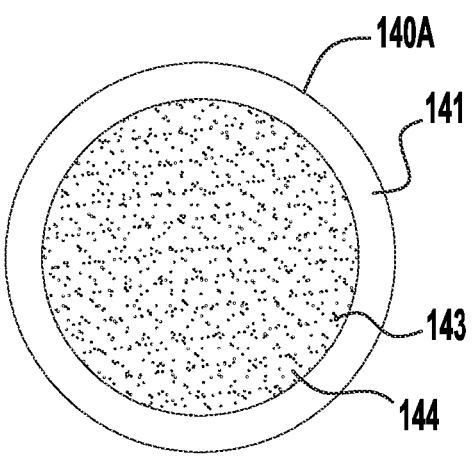

In the above embodiments, the graphite particles 142 and/or graphite powder 143 are mixed or embedded in the base filler material 141 composition and manufactured similar to that of a solid-type filler wire. However, in some embodiments of the present invention, the filler wire is cored. As shown in FIGS. 3A and 3B, filler material 141 forms a sheath around a core filled with flux 144. In this exemplary embodiment, the graphite particles 142 and/or graphite powder 143 can be mixed or embedded in the flux 144 instead of (or in addition to) the filler material 141. In other embodiments of the present invention, the flux 144 is not included in the wire 140A, and only the graphite particles 142 and/or the graphite powder 143 are present in the core material. The core material can be manufactured similar to flux materials used in arc welding cored electrodes. For example, the core can be a granular flux having a composition similar to that of existing flux cored electrodes, except that the wear low friction particles and/or powder is also added to the flux material. In further exemplary embodiments, the construction of the wire 140A is similar to that of a metal cored wire where each of the sheath 141 and the core are solid, but the core has a solid composition including the low friction particles (e.g., graphite) as described herein. Furthermore, exemplary embodiments of the present invention are not limited to the configurations shown in the figures, such that the flux with the low friction particles can be an outer layer of the wire 140A which is deposited over a solid core portion. This construction is similar to that of self-shielding stick electrodes, which have a flux coated on an outer surface of a solid core.

Figure 5A:
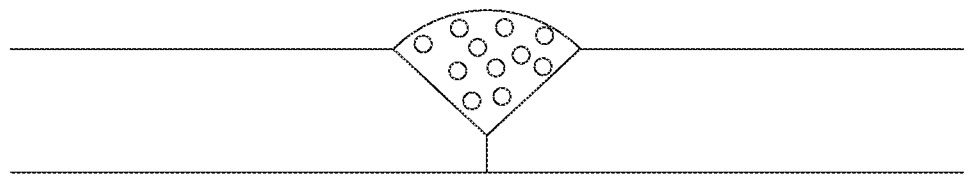
FIG. 5A illustrates a cross-sectional view of an exemplary weld that can be formed using the exemplary embodiments of filler wires illustrated in FIGS. 2A and 3A.
Figure 5B:
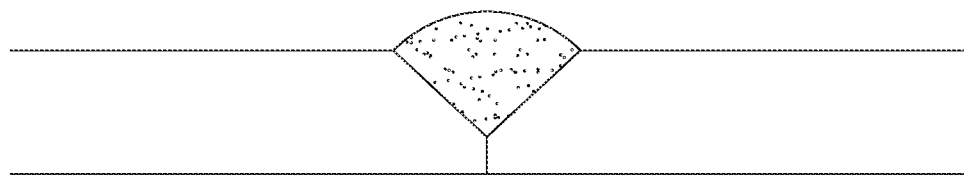
FIG. 5B illustrates a cross-sectional view of an exemplary weld that can be formed using the filler wires illustrated in FIGS. 2B and 3B.

FIG. 5A illustrates a cross-sectional view of a weld wire 140C with self-lubricating material that was deposited using the filler wires illustrated in FIG. 2A or 3A. Similarly, FIG. 5B illustrates a cross-sectional view of a weld with self-lubricating material that was deposited using the filler wires illustrated in FIG. 23 or 3B. As shown in FIGS. 5A and 5B, the self-lubricating materials are found throughout the weld. Thus, as the hot-wire consumable 140A-C is deposited into the weld puddle the low friction particles are distributed throughout the molten puddle and when the puddle solidifies the particles are distributed throughout. It is noted that although FIGS. 5A and 5B show a typical weld joint embodiments of the present invention are not limited in this regard as the wires can also be used for cladding/surfacing operations, and can be used in other weld joint types. These figures are intended to be exemplary. For example, these figures depict exemplary weld joints and, of course, embodiments of the present invention can be used for cladding or overlaying operations without departing from the spirit or scope of the present invention. With the distribution of the low friction particles throughout the joint, as the joint wears down through exposure, mechanical friction, etc. the joint/deposit will consistently expose additional layers of particles such that the low friction aspects of the joint/deposit is relatively consistent throughout its thickness. For example, if the filler is used in a cladding/surfacing operation as the cladding is worn away new particles are exposed, thus providing consistent low friction properties throughout the thickness of the cladding layer.

In other exemplary embodiments, processes can be used such that the wire 140A-C is used at the end of the fill process such that only the top layer (i.e., the last pass of the weld bead) or layers will include the low friction materials.

Of course, the self-lubricating or low friction materials (e.g., graphite) and the filler material need not be included in the same filler wire 140A-C. (Reference herein to the wire 140 is intended to be inclusive of all of the embodiments, e.g., 140A/C, of the wire disclosed herein.) Because an arc is not used to transfer the filler wire 140 (140A) to the weld puddle 145, the feeder subsystem 150 can be configured to simultaneously provide more than one wire to the puddle at the same time, in accordance with certain other embodiments of the present invention. For example, a first wire may be used for depositing the self-lubricating materials (e.g., the graphite particles 142 or graphite powder 143) to the workpiece 115, and a second wire may be used to add structure to the workpiece. The first or second wire (or additional wires) may also be used for hard-facing and/or providing corrosion resistance to the workpiece 115. In addition, by directing more than one filler wire to any one weld puddle, the overall deposition rate of the weld process can be significantly increased without a significant increase in heat input. Thus, it is contemplated that open root weld joints can be filled in a single weld pass. Further, in other exemplary multi-wire embodiments one of the wires (for example the leading wire) can deposit the matrix of the weld joint while any additional wires adds the wear resistant particles as described herein. Such embodiments can provide the ability to customize or tailor the bead profile or chemistry to provide a desired performance for specific conditions.

As discussed above, the filler wire 140 (140A) is melted into the weld puddle. 145 without an arc. Thus, the wire 140 (140A) does not experience the extreme heat of the arc, which can be as high as 8,000° F. However, the melting temperature of the filler wire 140 (140A) will vary depending on the size and chemistry of the wire 140 (140A) and can exceed 1,500° F. Accordingly, in some exemplary embodiments of the present invention, the low friction particles are to have a melting burning temperature higher than that of the remaining filler wire composition. For purposes of the present application, the burning temperature can be the vaporization or boiling temperature of the material. This aids in ensuring that the wire melts before the integrity of the low friction particles is compromised. However, to the extent the low friction materials are included in a filler wire having a melting temperature higher than that of the particles (or the puddle temperature will be higher than the melting/burning temperature of the particles) the particles within the filler wire 140A/C may need to be protected based on the melting temperature of the filler wire 140A/C.

For example, some exemplary embodiments discussed above use graphite as the wear resistant material. Graphite can burn in the presence of oxygen and form carbon dioxide. In air, which is about 21% oxygen, graphite will burn at about 1,550° F. Accordingly, in situations where the temperature of the weld puddle 145 and/or the melting point of the wire 140 exceeds the temperature at which graphite burns, care must be taken to not expose the graphite in the filler wire 140 (140A) to oxygen.

In some exemplary embodiments, the filler wire 140 (140A) can include a flux that protects the weld area from oxidation. In such embodiments, the flux may form a protective slag over the weld area to shield the weld area from the atmosphere and/or form carbon dioxide to protect the weld area. Such a flux coating is generally known and often used with self-shielding electrodes. In some exemplary embodiments, the flux is a coating (not shown) on the filler wire. In other embodiments, the flux is disposed in the core of the filler wire as illustrated in FIGS. 3A and 3B. The compositions of such fluxes are generally known and will not be discussed herein. In other exemplary embodiments, the system 100 can include a shielding gas system which delivers a shielding gas to the puddle 145 during the operation to shield the operation from the atmosphere. The shielding gas can be an inert gas, such as argon, and can generally use known shielding gases that do not contain oxygen.

Figure 4:
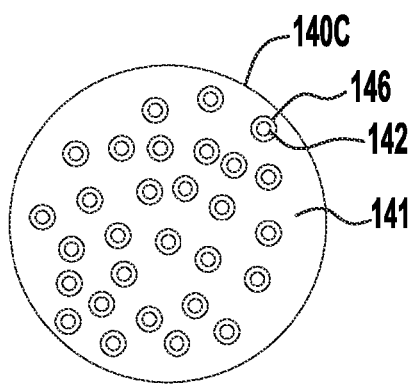
FIG. 4 illustrates an exemplary embodiment of a filler wire that can be used in the system of FIG. 1.

In still other exemplary embodiments, the low friction particles 142 may be coated to isolate the particles from any oxygen that may be present, or to isolate the particle from the heat of the puddle 145 and/or heating of the wire. Of course, the powder 143 can also be coated. For example, as illustrated in FIG. 4, the particles 142 are coated or encapsulated using an appropriate coating 146. In some exemplary embodiments, the coating 146 may be a metal alloy such as nickel or a nickel alloy. In exemplary embodiments, the coating thickness can be in the range of 1 to 30 microns, and in another exemplary embodiment be in the range of 5 to 30 microns, and the thickness can depend on the size of the particles being coated. Of course, the present invention can include coating thicknesses that fall outside this range. In some embodiments, the coating 146 is selected that its melting temperature is above the melting temperature of the filler material 141 and/or the weld puddle 145. Accordingly, because the coating 146 will not melt in these embodiments, the particles 142 will not be exposed to the atmosphere during the welding process. Alternatively, in other embodiments, the coating 146 will melt only after the filler wire 140 (140A) makes contact with the weld puddle 145, which is maintained at a temperature that is above the melting point of the coating 146. Because the particles 142 are already in the weld puddle 145 before the coating 146 melts, the exposure to the atmosphere and thus any burning of the graphite is limited. Of course, flux and inert gas may also be used to further limit the particles exposure to the atmosphere by displacing or consuming any oxygen around the weld puddle 145.

Figure 6:
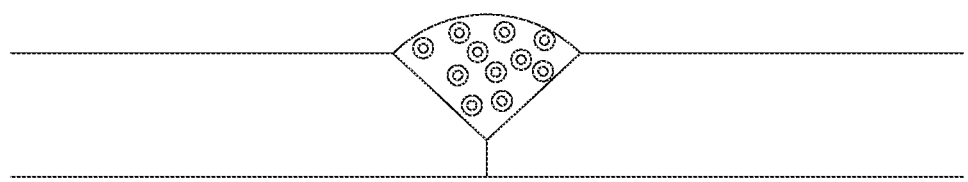
FIG. 6 illustrates a cross-sectional view of an exemplary weld that can be formed using the filler wires illustrated in FIG. 4.

Further, the coating acts as a thermal barrier to inhibit heat from the puddle 145 and the heating of the wire from reaching the particles. As such, the coating 145 can be a material and a thickness which provides a thermal barrier that protects the low friction particles. That is, in some embodiments the coating 146 can be a composition that resists the transfer of heat such that the puddle cools and solidifies before the particles are destroyed by the heat. Further, the coating 146 can be of a thickness and composition such that least some of the coating 146 melts and is absorbed into weld puddle, but at least some of the coating 146 remains on the particles as the puddle cools. Thus, the coating 146 can be of a composition that is compatible with the puddle 145 but also inhibits the heat from the puddle and in the wire 140 from destroying the low friction particles. As stated above, such a material can be nickel or a nickel alloy which is deposited onto the particles before the particles are combined with the wire 140. Various manufacturing methods can be used to coat the particles, including using vapor deposition, or other similar coating methods. FIG. 6 illustrates a cross-sectional view of a weld with coated low friction material that was deposited using the filler wire illustrated in FIG. 4.

Figure 7:
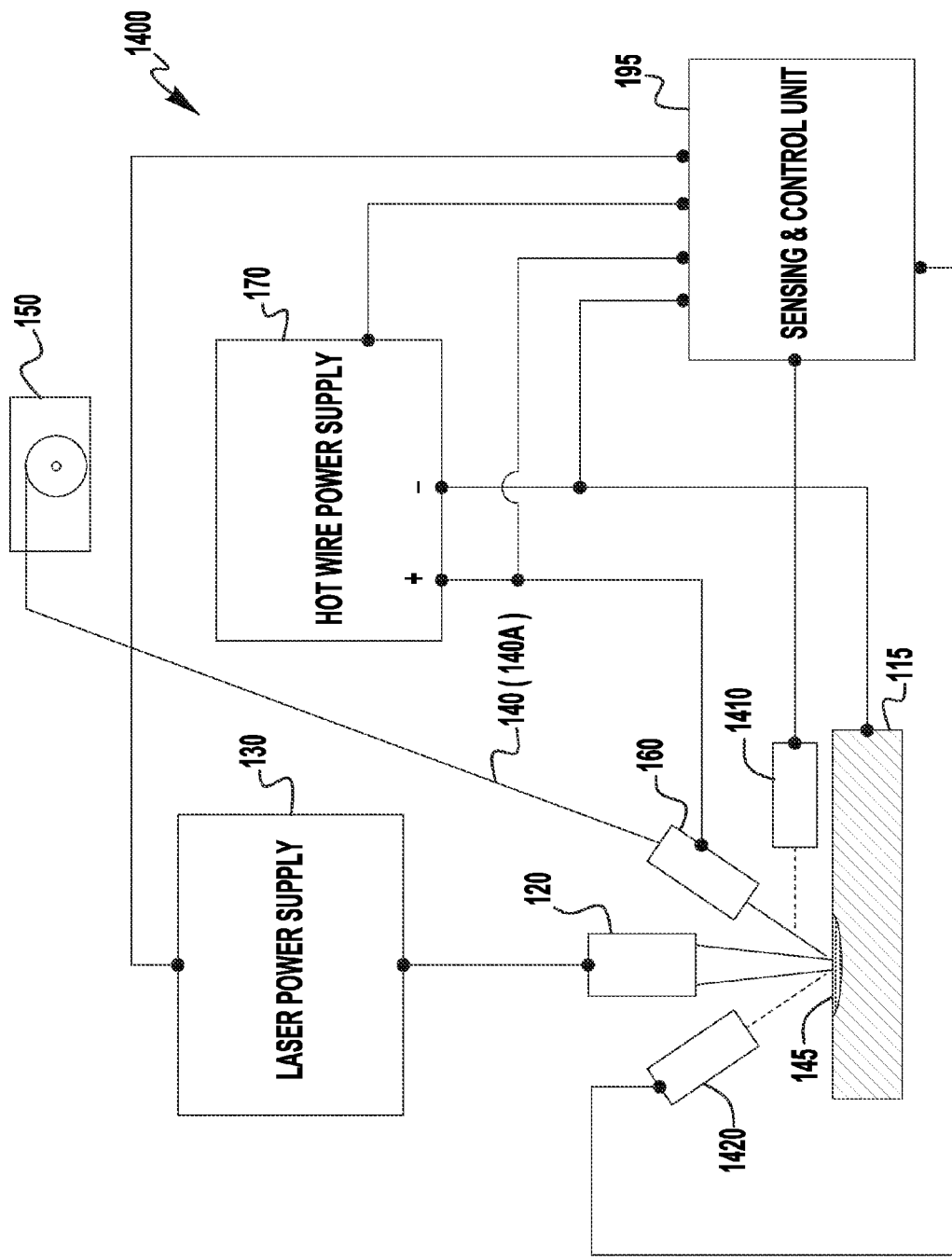
FIG. 7 illustrates a functional schematic block diagram of an exemplary embodiment of a combination filler wire feeder and energy source system for any of brazing, cladding, building up, filling, hard-facing overlaying, welding, and joining applications.

In the above embodiments, the temperature of the wire 140 (140A) and/or the weld puddle 145 can be an important operational parameter depending on the type of self-lubricating material being deposited. Accordingly, in yet another exemplary embodiment of the present invention as illustrated in FIG. 7, a system 1400 includes a thermal sensor 1410 that is utilized to monitor the temperature of the wire 140 (140A, 140C). The system 1400 is similar to the system 100 and, for brevity, only the relevant differences will be discussed. The thermal sensor 1410 can be of any known type capable of detecting the temperature of the wire 140 (140A). The sensor 1410 can make contact with the wire 140 (140A) or can be coupled to the tip of contact tube 160 so as to detect the temperature of the wire. In a further exemplary embodiment of the present invention, the sensor 1410 is a type which uses a laser or infrared beam which is capable of detecting the temperature of a small object—such as the diameter of a filler wire—without contacting the wire 140 (140A). In such an embodiment the sensor 1410 is positioned such that the temperature of the wire 140 (140A) can be detected at the stick out of the wire 140 (140A)—that is at some point between the end of the tip of contact tube 160 and the weld puddle 145. The sensor 1410 should also be positioned such that the sensor 1410 for the wire 140 (140A) does not sense the temperature of weld puddle 145.

The sensor 1410 is coupled to a sensing and control unit 195 such that temperature feed back information can be provided to the power supply 170, the laser power supply 130, and/or wire feeder 150 so that the control of the system 1400 can be optimized. For example, the power or current output of the power supply 170 can be adjusted based on at least the feedback from the sensor 1410. That is, in an embodiment of the present invention either the user can input a desired temperature setting (for a given weld and/or wire 140 (140A)) or the sensing and control unit 195 can set a desired temperature based on other user input data (type of self-lubricating material, coating of self-lubricating material, wire feed speed, electrode type, etc.) and then the sensing and control unit 195 would control at least the power supply 170, laser power supply 130, and/or wire feeder 150 to maintain that desired temperature.

In such an embodiment it is possible to account for heating of the wire 140 (140A) that may occur due to the laser beam 110 impacting on the wire 140 (140A) before the wire 140 (140A) enters the weld puddle 145. In embodiments of the invention the temperature of the wire 140 (140A) can be controlled only via power supply 170 by controlling the current in the wire 140 (140A). However, in other embodiments at least some of the heating of the wire 140 (140A) can come from the laser beam 110 impinging on at least a part of the wire 140 (140A). As such, the current or power from the power supply 170 alone may not be representative of the temperature of the wire 140 (140A). As such, utilization of the sensor 1410 can aid in regulating the temperature of the wire 140 (140A) through control of the power supply 170, the laser power supply 130 and/or wire feeder 150.

In a further exemplary embodiment (also shown in FIG. 6) a temperature sensor 1420 is directed to sense the temperature of the weld puddle 145. In this embodiment the temperature of the weld puddle 145 is also coupled to the sensing and control unit 195. However, in another exemplary embodiment, the sensor 1420 can be coupled directly to the laser power supply 130. Feedback from the sensor 1420 can be used to control output from laser power supply 130/laser 120. That is, the energy density of the laser beam 110 can be modified to ensure that the desired weld puddle temperature is achieved.

In FIGS. 1 and 7 the laser power supply 130, hot wire power supply 170, wire feeder 150, and sensing and control unit 195 are shown separately for clarity. However, in embodiments of the invention these components can be made integral into a single welding system. Aspects of the present invention do not require the individually discussed components above to be maintained as separately physical units or stand alone structures.

Figure 8A:
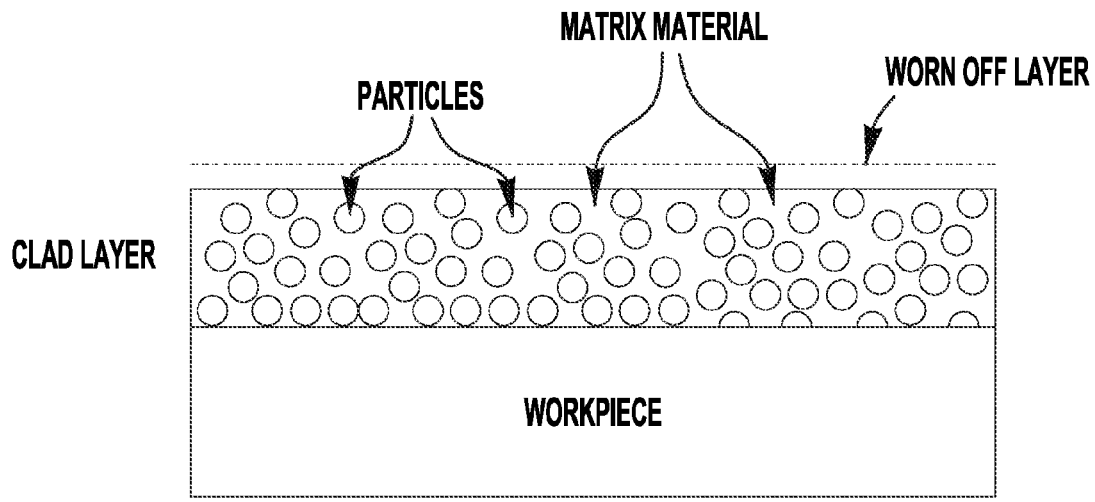
FIGS. 8A and 8B depict exemplary cladding layers depicting use of embodiments of the present invention.
Figure 8B:
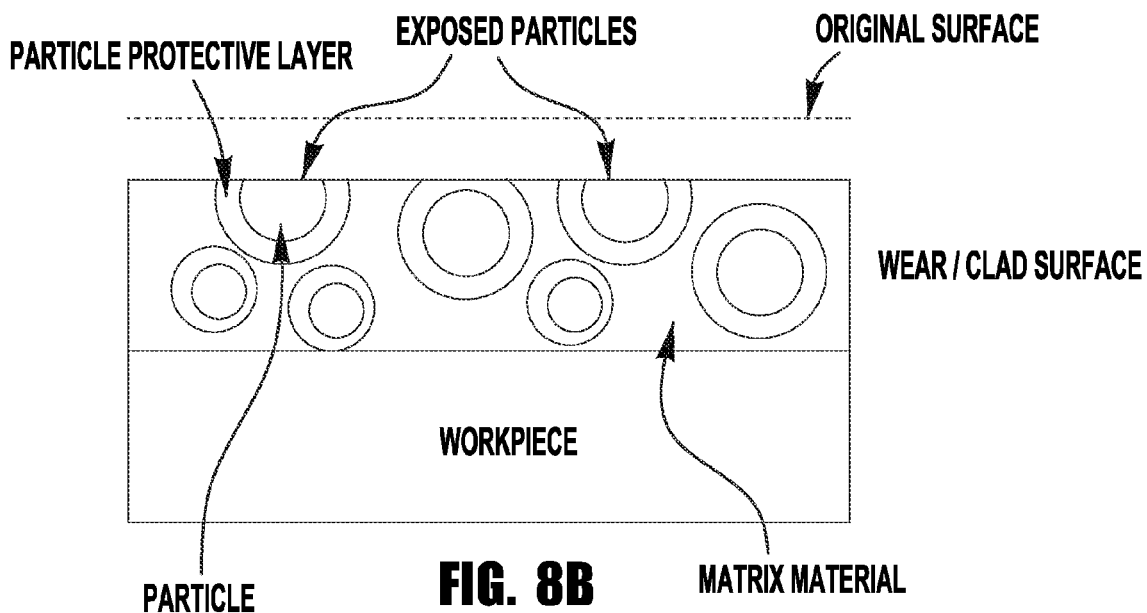

FIGS. 8A and 8B depict exemplary cladding layers that can be created with embodiments of the present invention. FIG. 8A shows a cladding layer on a workpiece with the particles distributed throughout the matrix. As shown, as the cladding layer is worn new particles are continuously exposed such that the cladding layer can provide lubrication throughout the entire thickness of the cladding layer. Similarly, FIG. 8B shows a similar clad layer where the particles are covered by the particle protective layer (as described herein), and as the dad surface and protective layers are worn away the particles become exposed.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A hot-wire consumable, the consumable comprising:
a base filler material, and
at least one of self-lubricating particles having a nominal diameter in a range of 200 microns to 400 microns and self-lubricating powder having a nominal diameter in a range of 4 microns to 200 microns
and said at least one of said self-lubricating particles and said self-lubricating powder is coated, wherein said coating comprises at least one of nickel and nickel alloy and has a thickness in a range of 1 to 30 microns.

2. The consumable of claim 1, wherein said at least one of said self-lubricating particles and said self-lubricating powder represents a combined volume percentage in said consumable in the range of 5% to 50%.

3. The consumable of claim 1, further comprising:
a flux disposed over said base filler material to form an outer layer, said base filler material forming a solid core portion of said filler wire,
wherein said at least one of said self-lubricating particles and said self-lubricating powder is mixed with said flux in said outer layer of said consumable.

4. The consumable of claim 1, wherein said consumable is a solid-type wire, and
wherein said at least one of said self-lubricating particles and said self-lubricating powder is mixed with said base material and said mixture is sintered to form said solid-type wire.

5. The consumable of claim 1, wherein said consumable is a cored-type wire, said base material forming a sheath around a core, and
wherein said core comprises said at least one of said self-lubricating particles and said self-lubricating powder.

6. The consumable of claim 5, wherein said core comprises flux, and
wherein said at least one of said self-lubricating particles and said self-lubricating powder is mixed with said flux in said core.

7. The consumable of claim 1, wherein said consumable is a cored-type wire, said base material and a portion of said at least one of said self-lubricating particles and said self-lubricating powder forming a sheath around a core.

8. The consumable of claim 1, wherein said core comprises flux, and
wherein a remaining portion of said at least one of said self-lubricating particles and said self-lubricating powder is mixed with said flux in said core.

9. The consumable of claim 1, wherein a melting temperature or a burning temperature of said at least one of said self-lubricating particles and said self-lubricating powder is higher than a melting temperature of said base filler material.

10. The consumable of claim 1, wherein said consumable comprises both of said self-lubricating powder and said self-lubricating particles and a combined volume percentage of said self-lubricating powder and said self-lubricating particles in said consumable is in the range of 5% to 50%.

11. The consumable of claim 1, where said at least one self-lubricating powder and said self-lubricating particles is graphite.

12. The consumable of claim 1, where said at least one self-lubricating powder and said self-lubricating particles is at least one of graphite, copper, tin, and molybdenum disiulfide.

13. The consumable of claim 1, where said at least one self-lubricating powder and said self-lubricating particles is a combination of at least two of graphite, copper, tin, and molybdenum disulfide.

14. The consumable of claim 1, where said at least one self-lubricating powder and said self-lubricating particles is a combination of graphite and one of copper, tin, and molybdenum disulfide, and wherein said combined volume percentage of said consumable of said self-lubricating powder and said self-lubricating particles in said consumable is in the range of 5% to 50%.

15. The consumable of claim 1, wherein said thickness of said coating is in a range of 5 to 30 microns.

16. The consumable of claim 1, wherein the consumable comprises said self-lubricating particles having a nominal diameter in a range of 200 microns to 400 microns.

* * * * *